Patented Sept. 4, 1923.

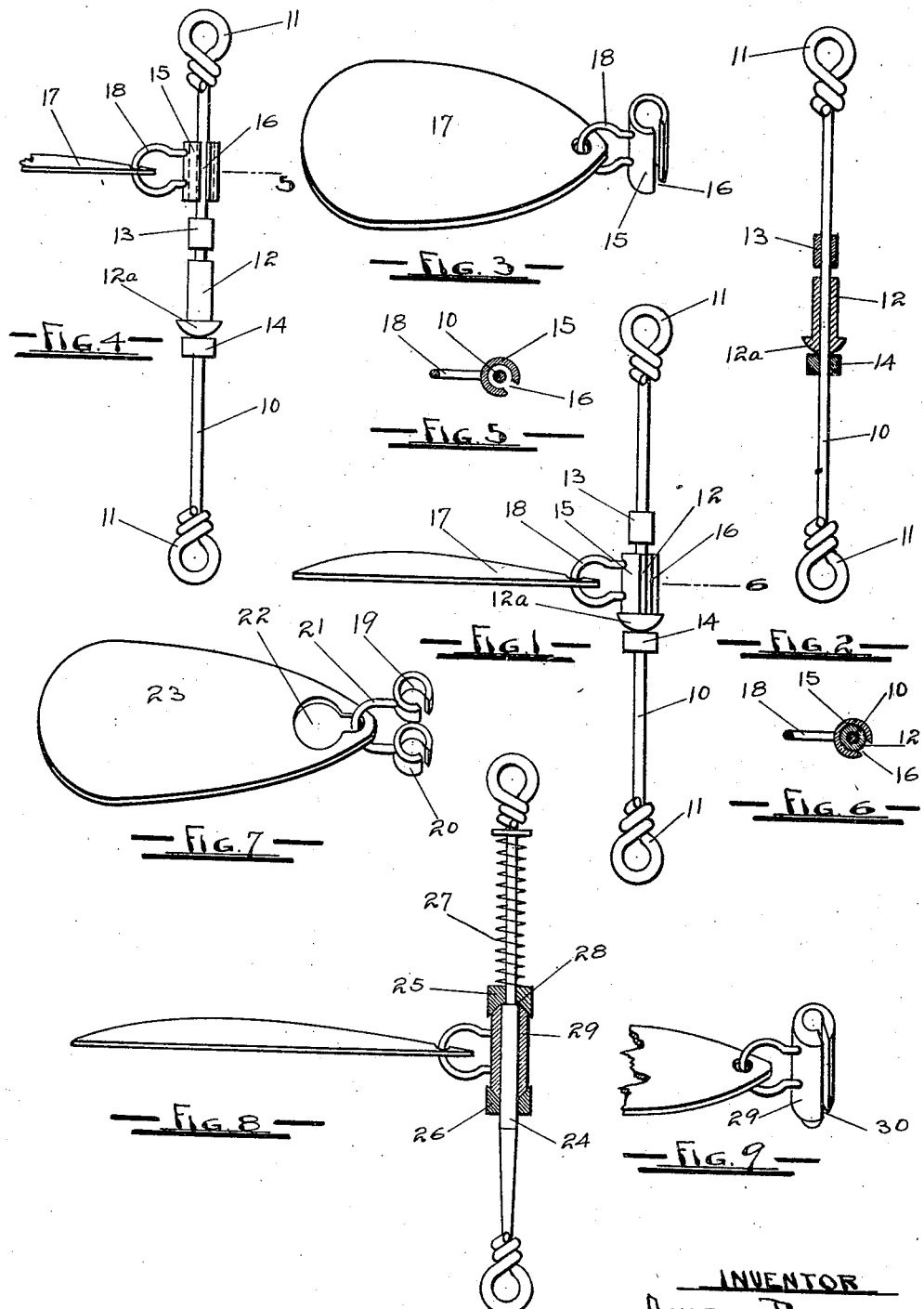

1,467,116

UNITED STATES PATENT OFFICE.

ANDREW REEKERS, OF PORTLAND, OREGON.

TROLLING SPOON.

Application filed March 13, 1922. Serial No. 543,361.

*To all whom it may concern:*

Be it known that I, ANDREW REEKERS, a citizen of the United States, residing at Portland, county of Multnomah, State of Oregon, have invented certain new and useful Improvements in Trolling Spoons, of which the following is a specification.

My invention relates to trolling spoons in general, the object being to provide means whereby the spoon portion may be readily disengaged and removed from the spindle about which the spoon portion rotates and another spoon mounted upon said spindle, thereby making it possible to change spoons very readily and conveniently without removing the spindle from the line or from the hook.

I accomplish the above object by means of the construction illustrated in the accompanying drawing, which is a part of this application for Letters Patent, like characters of reference indicating like parts throughout the several views thereof, and in which:

Fig. 1 is a side elevation of my device; Fig. 2 is an elevation of the spindle with the attached parts shown in section thereupon; Fig. 3 is a perspective view of the spoon with its ferrule or sleeve; Fig. 4 is a view of the spindle, with the spoon in process of being mounted thereupon or demounted therefrom; Fig. 5 is a section upon line 5 of Fig. 4; Fig. 6 is a section upon line 6 of Fig. 1; Fig. 7 is a perspective view of a modified form of spoon and ferrule or sleeve; Fig. 8 is a side elevation of a further modification, parts being shown in section; and Fig. 9 is a perspective view of the spoon and ferrule or sleeve as used in the modified form of Fig. 8.

In general my device consists of a rotary member mounted upon a spindle between two fixed collars, a ferrule or sleeve adapted to be easily mounted upon or removed from said rotary member, and a spoon attached to said ferrule or sleeve.

The spindle is that ordinarily used with such devices, composed of a wire 10 having loops 11 at each end thereof adapted for attaching respectively to the fish line and to the hook. Upon said spindle, about centrally disposed between said loops I provide a rotary member 12 longitudinally secured between collars 13 and 14, which collars are integral with the spindle 10.

The rotary member 12 is provided with a pivotal head $12^a$ which bears against the collar 14, and is disposed adjacent that loop 11 to which is attached the hook. The body portion of the rotary member 12 is of the same diameter as the collar 13.

A ferrule or sleeve 15 is provided to fit closely upon the rotary member 12, so that some force is required to remove said ferrule or sleeve from said rotary member longitudinally thereof. A longitudinal slot 16 is provided in the ferrule or sleeve 15 of sufficient width to enable the ferrule or sleeve 12 to be placed upon the spindle 10 between the collar 13 thereupon and the adjacent loop 11, as shown in Fig. 4. Said ferrule or sleeve may then be slipped over the collar 13 and upon the rotary member 12, coming to final position upon said member when said ferrule or sleeve contacts with the head $12^a$, as shown in Fig. 1. A spoon 17 is attached to the ferrule or sleeve by means of an eye 18 upon said ferrule or sleeve passing through an orifice in said spoon.

A variety of spoons may be carried by the fisherman, each attached to its respective ferrule or sleeve, and thus it is an easy matter to change a spoon for another without removing the spindle from either the line or hook.

In the modification shown in Fig. 7, the slotted sleeve or ferrule is divided into two parts, 19 and 20, each integral with its respective end of the eye 21, and there being a space between the adjacent ends of the parts 19 and 20. The orifice 22 in the spoon 23 is sufficiently large to admit of the parts 19 and 20 being passed therethrough. In this modified form only one ferrule or sleeve member is required to be carried by the fisherman, spoons of various characteristics being easily attached to said ferrule or sleeve member by passing either part 19 or 20 thereof through the orifice 22 in the spoon when said ferrule or sleeve member is dismounted from the spindle rotary member.

In the modification of Figs. 8 and 9 the rotary member upon the spindle is eliminated, and the ferrule or sleeve is mounted direct upon the spindle 24 between two collars 25 and 26 having female pivotal sockets oppositely disposed, as shown in Fig. 8. The collar 26 is integral with the spindle 24, and the collar 25 is slidable longitudinally of the spindle and is backed by a spring 27 which keeps said collar 25 in contact with a shoulder 28 upon the spindle, said shoulder also spacing the collars 25 and 26 apart. The ferrule or sleeve 29 is provided with a longitudinal slot 30 of sufficient width to slip over the small end of the spindle when the collar 25 is moved towards the spindle end and the spring 27 compressed. The ferrule or sleeve 29 is then moved over the large portion of the spindle until it contacts with the collar 26, whereupon the collar 25 is released and the spring 27 causes it to contact with the adjacent end of the ferrule or sleeve 29, as shown in Fig. 8. The ferrule or sleeve 29 is provided with cone shaped ends to fit into the recesses of the respective collars 25 and 26, and the shoulder 28 prevents the collars from binding the ferrule or sleeve therebetween.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A spindle; a rotary member upon said spindle; means to prevent longitudinal movement of said rotary member upon said spindle; a sleeve adapted to be mounted upon or removed from said rotary member; and a spoon attached to said sleeve.

2. A spindle; a spoon; a sleeve attached to said spoon; and a rotatable member upon said spindle adapted to receive said sleeve thereupon.

3. A spindle; spaced collars integral with said spindle; a rotary member upon said spindle between said collars; a sleeve detachably mounted upon said rotary member; and a spoon attached to said sleeve.

4. A spindle; spaced collars upon said spindle; a spoon; a sleeve attached to said spoon; and rotatable mechanism intermediate said collars upon which to mount said sleeve in a detachable manner.

5. A spindle; spaced collars upon said spindle; a spoon; and detachable rotatable means for connecting said spoon to said spindle intermediate said collars.

In witness whereof I claim the foregoing as my own I hereunto affix my signature in the presence of the two witnesses at Portland, county of Multnomah, State of Oregon, this 3rd day of March 1922.

ANDREW REEKERS.

Witnesses:
L. J. ROBINSON,
C. F. BLAKE.